H. PULSE.
Grain Drill.
No. 100,555. Patented March 8, 1870.
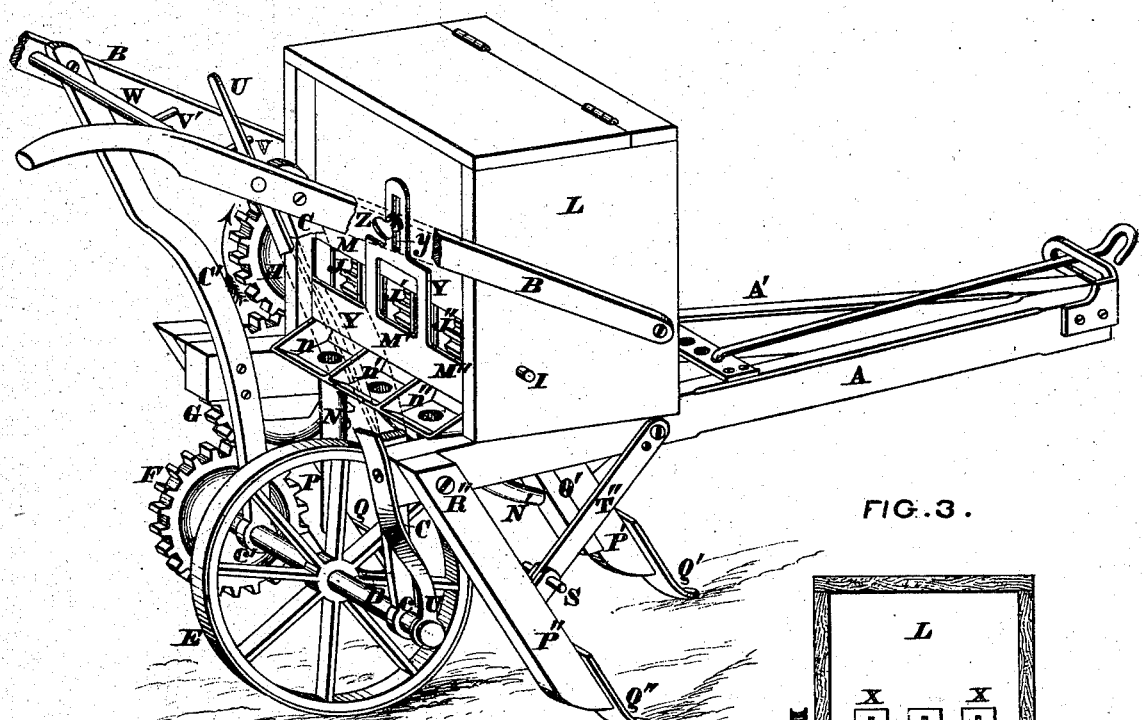
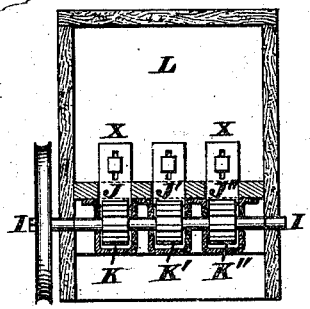
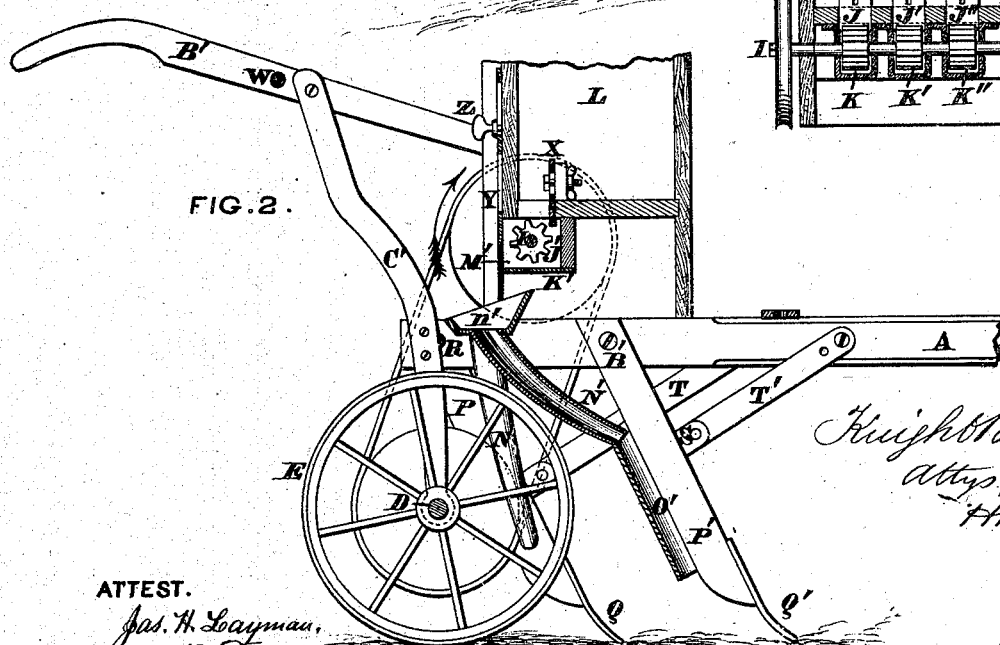

United States Patent Office.

HIRAM PULSE, OF WALDRON, INDIANA.

Letters Patent No. 100,555, dated March 8, 1870.

IMPROVEMENT IN GRAIN-DRILLS.

The Schedule referred to in these Letters Patent and making part of the same.

I, HIRAM PULSE, of Waldron, Shelby county, Indiana, have invented a new and useful Grain-Drill, of which the following is a specification.

Nature and Objects of the Invention.

My invention is designed as an improvement in the class of implements which, being drawn over a field by a horse or other animal power, operates to drop and cover the grain in suitable drills or furrows, parallel to each other.

General Description with Reference to the Drawings.

Figure 1 is a perspective view of a grain-drill embodying my invention, portions of the shifter and of the frame being broken away.

Figure 2 is a longitudinal section of the machine, the dropper being aperated by a chain or belt instead of cogs, from the ground-wheel.

Figure 3 is a transverse section of that part of my machine which contains the dropping mechanism.

A A' are two beams, which unite in a point at front, whence they diverge rearward, as shown, and are connected to the stilts or handles B B', by means of braces C C', which braces, being extended downward, terminate in eyes c c', which serve as journal-bearings for the axle D of ground-wheel E.

The axle D is capable of sliding endwise as well as of rotating in its said bearings, in order to enable the gearing or ungearing, at will, of the cog-wheels F and G, the former upon the end of the axle, and the latter journaled to a stud upon the beam, and itself meshing with a third cog-wheel, H, upon the shaft I of three dropping-wheels, J J' J", which occupy separate pits K K' K", that communicate above with a common hopper or grain-box, L, and at their rear sides, have openings M M' M", that discharge either through their upper or lower portions into the expanded open and visible mouths n n' n" of a series of grain-spouts, N N' N", which conduct, respectively, into the tubular portions O O' O" of as many sheaths P P' P", so as to drop the grain immediately in rear of the furrowing-flukes Q Q' Q".

The sheaths P P' P" are united to the frame by means of pivot-bolts R R' R", and through the medium of wooden pins S, by draw-bars T T' T", so that should either fluke strike an immovable obstacle, the wooden pin will give way, and thus save the machine from more serious injury.

The wheel F may be ungeared from the wheel G by endwise motion of the axle, through the instrumentality of a lever, U, whose upper end is held to either the geared or the ungeared position by pins V V' upon the stretcher W.

The dropping-wheels are corrugated as shown, and operate in conjunction with an adjustable gate or cut-off, X, so as to deliver a larger or smaller quantity of grain.

Applied to the rear openings of pits K K' K" is a gate, Y, that is attached at any desired height by means of a thumb-screw, Z, which, passing through a slot, y, in the said gate, enables the vertical adjustment of the latter, and being screwed fast in the rear side of the hopper, retains the said gate to its adjustment.

When beans, corn, or other large grain is to be planted, the gate Y is lowered, so as to compel the grain to rise over the top, or it may be slightly elevated from its lowest position, when desired to limit the flow of grain.

When wheat or other small grain is to be planted, the gate is more or less elevated, so as to let through the desired quantity. By this means I obtain a two-fold gauge of grain-delivery, namely, by means of the cut-off X, and again by means of the adjustable gate Y.

The seed in escaping from the pits K K' K" into the spouts N N' N", in plain view of the husbandman, the latter is enabled to at once detect any deficiency, and to promptly apply the remedy.

In the modification shown in fig. 2, a belt or chain q, replaces the cog-gearing connection of the ground-wheel with the seed-dropper. In this form, the coupling and uncoupling may be effected by any mitable clutch.

Claim.

1. The described arrangement of beams A A', handles B B' with the braces C c C' c', in which the sliding axle D of the ground-wheel E is journaled, when combined with the cog-gearing, or equivalent connection with the dropping-wheels J J' J", for the purpose explained.

2. The arrangement of dropping-wheels J J' J", pits K K' K", adjustable cut-off X, and adjustable gate Y y Z, adapted to discharge above or below, and in greater or lesser quantities, at option of the husbandman, in the manner designated.

3. In combination with the elements of the preceding claim, the expanded and visible mouths n n' n" of the grain-spouts.

In testimony of which invention I hereunto set my hand.

HIRAM PULSE.

Witnesses:
 GEO. H. KNIGHT,
 JAMES H. LAYMAN.